United States Patent [19]

Smith

[11] Patent Number: 5,234,203
[45] Date of Patent: Aug. 10, 1993

[54] PNEUMATIC SPRING FOR A VEHICLE SEAT

[75] Inventor: Rodney F. Smith, Seymour, Tenn.

[73] Assignee: National Seating Company, Vonore, Tenn.

[21] Appl. No.: 793,602

[22] Filed: Nov. 18, 1991

[51] Int. Cl.$^5$ .............................................. B60G 11/26
[52] U.S. Cl. .................................... 267/131; 248/631;
267/64.11; 267/64.27; 267/122
[58] Field of Search ................... 267/131, 117, 64.11,
267/64.23, 64.24, 64.27, 64.28, 64.26, 64.25,
122, 124, 139; 188/317, 319, 322.22, 322.15,
281, 282; 248/631, 636, 421; 280/711, 712

[56] References Cited

U.S. PATENT DOCUMENTS

| Re. 20,887 | 10/1938 | Mercier . | |
|---|---|---|---|
| 2,773,686 | 12/1956 | Nash | 267/64.27 X |
| 3,438,309 | 4/1969 | Boileau | 267/64.24 X |
| 3,447,795 | 6/1969 | Vickers | 267/64.27 X |
| 3,628,763 | 12/1971 | Auer . | |
| 3,667,707 | 6/1972 | Mui | 248/631 X |
| 3,788,628 | 1/1974 | Hotz, Jr. et al. | 267/64.24 |
| 3,889,936 | 6/1975 | Shimizu . | |
| 4,445,673 | 5/1984 | Clark . | |
| 4,493,481 | 1/1985 | Merkle | 267/64.27 |
| 4,518,154 | 5/1985 | Merkle | 267/64.27 X |
| 4,722,516 | 2/1988 | Gregg . | |
| 4,809,944 | 3/1989 | Smith et al. . | |
| 4,817,922 | 4/1989 | Hovance . | |
| 4,854,555 | 8/1989 | Ohkawa et al. | 267/64.27 X |

FOREIGN PATENT DOCUMENTS 1313745  5/1987  U.S.S.R. .............................. 267/117

Primary Examiner—Douglas C. Butler
Attorney, Agent, or Firm—Michael E. McKee

[57] ABSTRACT

A pneumatic spring for damping the relative motion between a vehicle seat and a base upon which the seat is mounted utilizes a rolling lobe sleeve, a plug secured within one end of the sleeve and a piston secured within the other end of the sleeve for movement toward and away from the plug as the sleeve rolls along the outside surface of the piston. The piston, sleeve and plug provide the surfaces of a variable-volume chamber, and the piston includes an internal piston cavity of a fixed size and shape. The variable-volume chamber and piston cavity contain a pneumatic fluid, and an orifice is provided within the piston which permits flow communication between the variable-volume chamber and the piston cavity. When the internal pressure of the variable-volume cavity is increased as the piston is moved toward the plug in response to relative motion between the seat and base, the orifice controls the rate at which pneumatic fluid contained within the variable-volume chamber is permitted to flow into the piston cavity so that the spring is provided with desirable rate characteristics when exposed to either low frequency input or high frequency input. In addition, the permitted flow of pneumatic fluid between the variable-volume chamber and the piston cavity returns the spring to rest in a condition of equilibrium relatively quickly and with few cyclic movements.

20 Claims, 5 Drawing Sheets

PNEUMATIC SPRING FOR A VEHICLE SEAT

BACKGROUND OF THE INVENTION

This invention relates generally to cushioning devices and relates more particularly to a pneumatic spring for damping the relative motion between two objects, such as a vehicle seat and a base upon which the vehicle seat is supported.

It is known that a pneumatic spring, such as an air spring, can be utilized within a vehicle seat assembly for damping the vibrations to which the vehicle seat may be exposed. One such spring which is shown and described in U.S. Pat. No. 3,628,763 utilizes a rolling lobe type of structure wherein a piston and an air-filled chamber having deformable walls are permitted to move relative to one another to damp relative movement as the walls of the air-filled chamber roll along the outside surface of the piston.

It is an object of the patent invention to provide a pneumatic air spring with vibration damping characteristics of a viscous damping nature which are damping characteristics beyond the normal structural damping characteristics of the above mentioned class of air spring. Structural damping is that damping caused by frictional forces produced between the molecules of a seemingly elastic body being flexed whereas viscous damping is caused by fluid friction and is characterized by the fact that the friction force is proportional to the speed of the moving body.

Another object of the present invention is to provide such a spring which effectively cushions vibrations through a broad range of vibration frequencies.

Still another object of the present invention is to provide such a spring whose spring rate characteristics during operation do not depend upon any mechanical adjustment or an active valve system.

Yet another object of the present invention is to provide such a spring which evidences a low spring rate when exposed to vibrations of low frequency yet evidences a higher, or more aggressive, spring rate when exposed to vibrations of high frequency and longer amplitude.

A further object of the present invention is to provide such a spring which when used for damping vibrations of a vehicle seat provides an occupant of the seat with enhanced ride comfort and helps to maintain the movement of the seat within a desirable range of seat travel.

A still further object of the present invention is to provide such a spring which, upon exposure to a shock of high frequency and high amplitude, returns to its equilibrium position with minimum oscillation.

A yet further object of the present invention is to provide such a spring of uncomplicated construction which decreases its unloading rate by effectively dissipating the energy from the loading cycle without active mechanism or frictional device.

One more object of the present invention is to provide a vehicle seat assembly within which such a spring is incorporated.

SUMMARY OF THE INVENTION

This invention resides in a pneumatic spring for damping the relative motion between two objects.

The spring includes a flexible tubular sleeve, a piston and a plug. The flexible tubular sleeve has two opposite ends and sidewalls which extend between the ends. The piston includes external sidewalls sized to accommodate longitudinal movement of the piston through the interior of the sleeve and has an internal cavity of a predetermined volume for holding a pneumatic fluid. One end of the tubular sleeve is attached about the piston so that as the piston is moved longitudinally through the sleeve as aforesaid, the sleeve sidewalls move as a rolling lobe along the external sidewalls of the piston. The plug closes one end of the tubular sleeve opposite the piston-end of the sleeve so that the piston, plug and sleeve collectively provide a variable-volume chamber for holding a pneumatic fluid so that as the piston is moved longitudinally through the sleeve toward the plug-end thereof, the volume of the chamber decreases. The spring also includes means defining an orifice providing continual flow communication between the piston cavity and the variable-volume chamber so that when the spring is interposed between two objects and the piston is moved longitudinally though the sleeve toward the plug-end thereof in response to relative motion between the two objects, the orifice controls the rate at which the pneumatic fluid contained within the variable-volume chamber is permitted to flow into the piston cavity.

The spring is advantageous in that it provides desirable spring rate characteristics when exposed to any vibration within a broad range of vibration frequencies. If, on one hand, the spring is exposed to a low frequency vibration so that the piston and plug are urged toward one another relatively slowly in response to the vibration, the internal pressure of the variable-volume chamber is increased slowly and a relatively small pressure differential is created between the variable-volume chamber and the piston cavity. Under these circumstances, the flow of pneumatic fluid through the orifice from the chamber to the piston cavity is generally sufficient to maintain the internal pressure of the chamber and cavity at close levels throughout the loading and unloading phases of the spring so that the chamber and cavity cooperate, in effect, as a single chamber to cushion the relative movement between the piston and the plug. If, on the other hand, the spring is exposed to a high frequency vibration of relatively high amplitude so that the piston and plug are urged quickly toward one another in response to the vibration, the internal pressure of the chamber escalates quickly throughout the loading phase of the spring and a high pressure differential is created between the variable-volume chamber and the piston cavity. Under these conditions, the flow of pneumatic fluid through the orifice from the chamber to the piston cavity is generally insufficient to maintain the internal pressure of the chamber and cavity at close levels throughout the loading period of the spring. Consequently, when the spring is exposed to a high frequency vibration of high amplitude, the piston cavity does not contribute appreciably to the cushioning effect of the spring so that the spring exhibits a higher spring rate and thus a greater capability to limit the spring movement within desired bounds.

An additional advantage provided by the spring relates to its capacity to return to a condition of equilibrium following exposure of the spring to a shock of high frequency and high amplitude. In this connection, the orifice continually permits pneumatic fluid to flow from the chamber or cavity of higher pressure to the cavity or chamber of lower pressure from the moment of exposure of the spring to the forces of a shock to the moment that the spring returns to rest in its condition of equilibrium. Such a permitted flow of pneumatic fluid effectively bleeds off energy which would otherwise be stored up within the chamber or cavity of higher pressure as the spring moves between its compression (i.e., jounce) and extension (i.e., rebound) limits before settling to rest. With a smaller amount of energy stored within the chamber or cavity of higher pressure upon elongation or contraction of the spring to either of its extension or compression limits, the spring is urged toward the opposite compression or extension limit with a smaller amount of force. Consequently, the spring settles to rest with reduced oscillations relative to the number of oscillations commonly experienced by air springs of ordinary class.

DETAILED DESCRIPTION OF THE ILLUSTRATED EMBODIMENT

Figure 1:
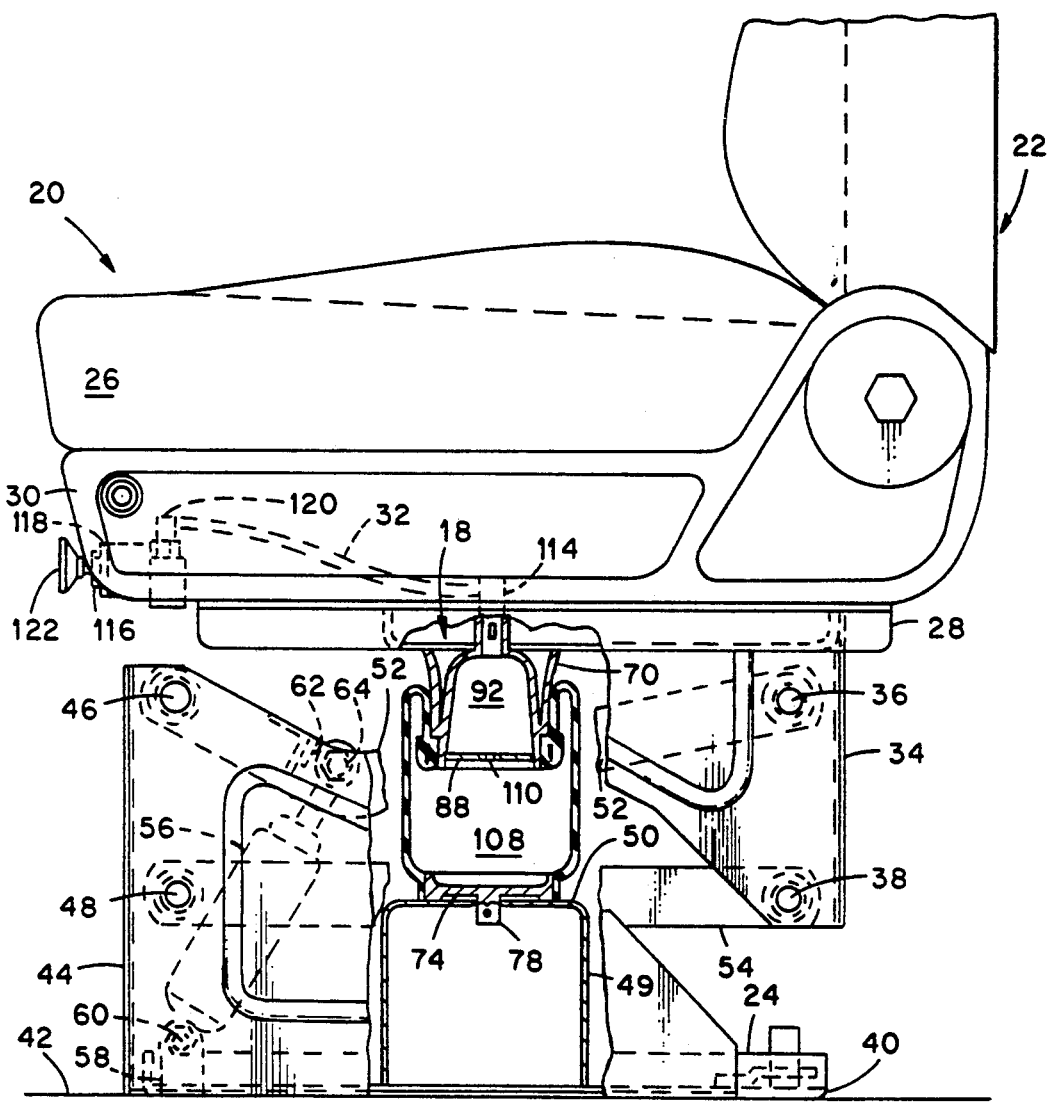
FIG. 1 is a fragmentary side elevational view, shown partly in section, of a vehicle seat within which an embodiment of a pneumatic spring is incorporated.

Turning now to the drawings in greater detail and considering first FIG. 1, there is shown an environment in which a pneumatic spring, generally indicated 18, embodying features of the present invention is utilized. The illustrated environment includes a vehicle seat assembly 20 including a vehicle seat 22 and a base 24 upon which the seat 22 is supported for movement relative to the base 24 along a generally vertical path. As will be explained in greater detail herein, the pneumatic spring 18 is interposed between the seat 22 and base 24 to dampen the vertical vibrations of the seat 22 as the vehicle within which the assembly 20 is mounted is operated. By damping these vertical movements of the seat 22, the occupant of the seat 22 is provided with a relatively smooth ride.

Although the pneumatic spring 18 is shown utilized in a seat assembly 20 of a type which is well-suited for use in a truck or bus, the spring 18 may be utilized in other applications for damping the relative movement between two objects. Accordingly, the principles of the present invention can be variously applied.

The seat 22 of the seat assembly 20 includes a bottom cushion 26 and a pan 28 upon which the cushion 26 is supported. A seat frame 30 is interposed between the cushion 26 and pan 28, and the frame 30 and pan 28 collectively provide spacing for an air hose 32 routed to the spring 18. The pan 28 is secured atop the spring 28 so that during spring operation, the top of the spring 28 acts against the underside of the pan 28. The seat 22 also includes a U-shaped upper support 34 which is attached to so as to depend downwardly from the pan 28 and is arranged about the spring 18 so that the U of its U-shape opens forwardly of the seat 20. For a reason which will be apparent herein, a pair of pivot pins 36, 38 extend transversely of the seat 28, and the opposite ends of the pins 36, 38 are journaled within the opposite sides of the U-shaped support 34.

With reference still to FIG. 1, the base 24 includes a bottom plate 40 which overlies and is attached to the vehicle floor, indicated 42, and a lower U-shape support 44 which is attached to the plate 40 so as to extend upwardly therefrom and is arranged about the spring 18 so that the U of its U-shape opens rearwardly of the seat 20. For a reason apparent herein two pivot pins 46, 48 extend transversely of the base 24 and the opposite ends of the pins 46, 48 are journaled within the opposite sides of the U-shaped support 44. The base 24 also includes a pedestal 49 fixed generally centrally of the bottom plate 40 and having a top surface 50 which is elevated above the plate 40.

Pivotally connected between the upper and lower supports 34 and 44 are pairs of lower and upper suspension arms 52 and 54, respectively. Each suspension arm 52 or 54 has opposite ends which are joined to a corresponding set of the pivot pins 36, 46 and 38, 48. As the seat 22 is raised or lowered with respect to the base 24, each suspension arm 52 is permitted to pivot relative to the supports 34, 44 by means of the pivot pins 36, 46, and each suspension arm 54 is permitted to pivot relative to the supports 34, 44 by means of the pivot pins 38, 48. The pivot pins 46, 48 adjacent the front of the seat 22 and the pivot pins 36, 38 adjacent the rear of the seat 22 are disposed relative to one another so that as the seat 22 moves upwardly and downwardly relative to the base 24, the seat cushion 26 is maintained in a substantially horizontal orientation.

The seat assembly 20 also includes a shock absorber 56 which extends between so as to be connected between the base 24 and the each of the upper suspension arms 52. To this end, the lower end of the shock absorber 56 is connected by means of a pivot pin 60 to a lug 58 which projects upwardly from the bottom plate 40 and the upper end of the shock absorber 56 is connected by means of a pivot pin 64 to a rigid member 62 which extends between the upper suspension arms 52. During use of the vehicle seat assembly 20, the shock absorber 56 helps to dissipate the energy created by the vertical movement of the seat 22.

Figure 2:
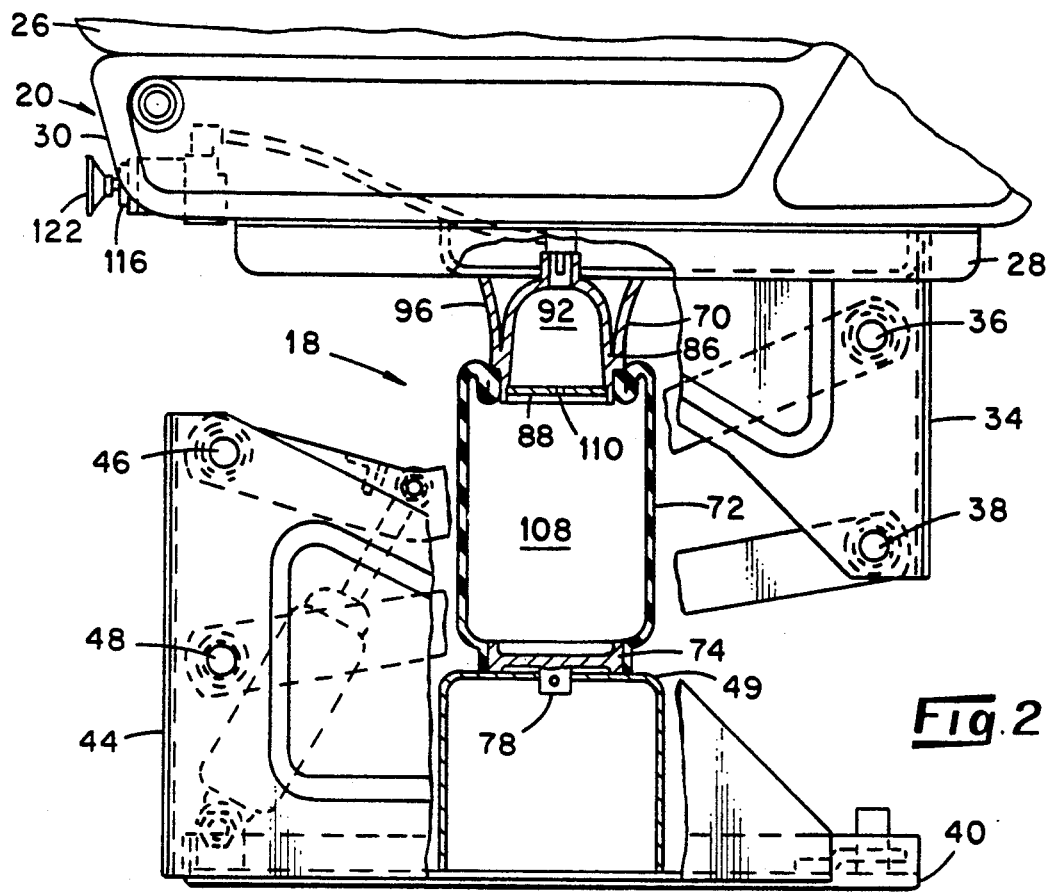
FIG. 2 is a view similar to that of FIG. 1 illustrating the spring when fully extended.
Figure 3:
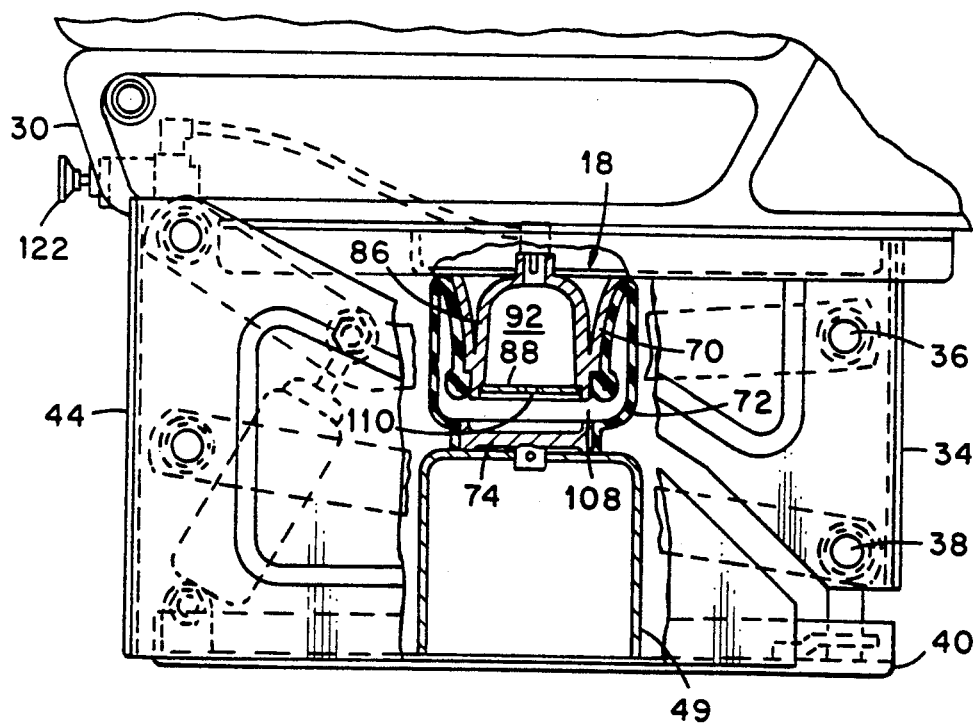
FIG. 3 is a view similar to that of FIG. 1 illustrating the spring when fully compressed.
Figure 4:
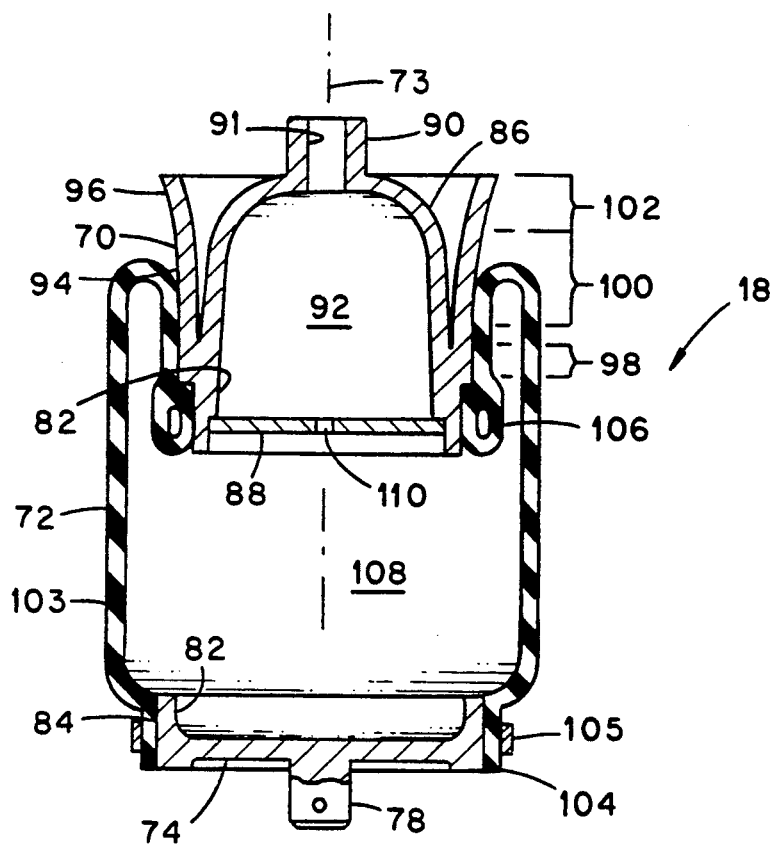
FIG. 4 is a view of the spring of the FIG. 1 seat drawn to a slightly larger scale.

With reference to FIGS. 2-4, the pneumatic spring 18 includes a piston 70, a rolling lobe sleeve 72 and a plug 74. The plug 74 includes a section 82 which is cup-shaped in form and is arranged within the spring 18 so that the section 82 opens upwardly as shown in FIG. 4. Provided along the circular periphery of the section 82 is a flange which provides a cylindrical outer wall 84. The plug 74 also includes a protuberance 78 which is joined to so as to extend downwardly from the section 82 as shown in FIG. 4 to facilitate the mounting of the spring 18 upon the pedestal 49 of the base 24. In this connection, the pedestal 49 includes a central opening 80 in its top surface 50 which is sized to accept the protuberance 78 of the spring 18 for attachment thereto. With the protuberance 78 positioned within the opening 80 as shown in FIGS. 1-3 so that the section 82 engagably overlies the top surface 50 of the pedestal 49, the spring 18 is positioned to act against the base 24 through the pedestal 49.

The piston 70 is elongated in shape with upper and lower ends, as viewed in FIG. 4 and is arranged within the sleeve 72 so that its longitudinal axis, indicated 93, is generally aligned with the longitudinal axis of the sleeve 72. The piston 70 is constructed of a relatively rigid material, such as a hard plastic, and includes a central cup-shaped section 86 arranged so as to open generally downwardly as viewed in FIG. 4 and a rigid face plate 88 fixedly attached across to so as to span the opening of the cup-shaped section 86. Collectively, the cup-like section 86 and face plate 88 provide an internal cavity 92 of substantially fixed size and shape for containing a quantity of air under pressure. Associated with the cup-shaped section 86 is an air nipple 90 having an air passageway 91 which opens into the internal cavity 92. As will be apparent herein, air is directed through the nipple 90 to adjust the working pressure of the air contained within the spring 18.

The piston 70 also includes a wall section 94 joined about the sides of the cup-shaped section 86 so as to provide an outer control surface 96 along which the sleeve 72 is adapted to move during use of the spring 18. In the depicted embodiment, the control surface 96 of the piston 70 is somewhat frustro-conical in shape so that the end of the control surface 96 closest to the plug 74 is smaller in diameter than the end of the control surface 96 farthest from the plug 74. Moreover, the control surface 96 has a positive taper with respect to the longitudinal axis 93 of the piston 70 in that the diameter of the control surface 96 generally increases as a path is traced therealong from the control surface end closest to the plug 74 to the control surface end farthest from the plug 74.

Still further, the control surface 96 of the depicted embodiment includes a number of segments 98, 100, 102 having different degrees of taper relative to the piston axis 93. In the interests of this invention, each segment of the control surface 96 could have a negative taper, no taper or a positive taper to affect a desired spring rate a desired.

The amount or degree of taper of each segment 98, 100, 102 may be selected to provide the air spring 18 with desired characteristics (e.g., spring rate) at predetermined positions of spring extension. In the depicted embodiment 18, one, or a first, segment 98 of the control surface 96 is substantially cylindrical in shape and thus has no taper relative to the axis 93. The adjacent, or second, segment 100 of the control surface 96 has a taper of about 5° relative to the axis 93, and the last, or third, segment 102 has a taper of about 10° relative to the axis 93. The three surface segments 98, 100, 102 are joined by arcuate areas which provide a smooth transition between adjacent segments 98, 100 and 100, 102.

The flexible sleeve 72 of the spring 18 has air-impermeable walls 103 and two opposite ends 104, 106 which are each connected to a corresponding one of the piston 70 and plug 74. In particular, the sleeve end 104, or the lower end as viewed in FIG. 4, is clamped in sealing relationship about the outer wall 84 of the plug 74 by means of a clamp 105, and the other sleeve end 106 is clamped or swaged in sealing relationship about the cup-shaped section 86 of the piston 70 adjacent the smaller end of the control surface 96. As viewed in FIG. 4, a portion of the sleeve 72 adjacent the sleeve end 106 is folded back within itself so as to provide the sleeve 72 with an upwardly-projecting lobe. As the piston 70 is permitted to move toward and away from the plug 74 during operation of the spring 18 between a fully extended condition as illustrated in FIG. 2 and a fully compressed position as illustrated in FIG. 3, the lobe of the sleeve 72 rolls along the control surface 96. It follows that the sleeve 72, face plate 88 and plug 74 provide a variable-volume chamber 108 whose volume decreases as the piston 70 moves toward the plug 74 and whose volume increases as the piston 70 moves away from the plug 74. As will be apparent herein, the variable-volume chamber 108 is adapted to contain a quantity of air under pressure.

It is a feature of the spring 18 that the face plate 88 includes a small orifice 110 located centrally thereof which provides continual flow communication between the variable-volume chamber 108 and the piston cavity 92. Upon the creation of a pressure differential between the chamber 108 and piston cavity 92, air is permitted to flow through the orifice 110 from the chamber 108 or cavity 92 of higher pressure to the cavity 92 or chamber 108 of lower pressure. The orifice 110 of the depicted spring 18 is circular in shape and possesses a preselected diameter for controlling the rate at which air is permitted to flow through the orifice 110.

As mentioned earlier, the working pressure of the spring 18 can be controlled by directing air into or out of the spring 18 through the air nipple 90 of the piston 70. To this end, the air supply hose 32 (FIG. 1) is connected at one of its ends to the nipple 90 by way of an elbow coupling 114 and is connected at the other of its ends to an air control valve 116. The air control valve 116 is supported by the seat frame 30 at a position beneath the cushion 26 and adjacent the forward end thereof where it is conveniently accessible to an occupant of the seat 22. The air control valve 116 includes a coupling 118 connectible to a supply of compressed air (not shown), a push/pull type control button 122 and an outlet 120 to which the hose 112 is connected. Upon connecting the valve 116 to the compressed air supply and opening the valve 116 by appropriately manipulating the control button 122, compressed air is delivered to the spring 18 to raise its internal pressure. Conversely, by opening the valve 116 to permit communication between the piston cavity 92 and the atmosphere, the air contained within the spring 18 can be vented. In either case, the valve 116 is closed when the internal pressure of the spring 18 is raised or lowered to the desired amount so that the spring 18 becomes a closed, captive system for the air contained therein.

It will be understood from the foregoing that as the internal pressure of the spring 18 is raised by the addition of air to the spring 18, the length of the spring 18 is increased. Similarly, as the internal pressure of the spring 18 is lowered by the venting of air from the spring, the length of the spring 18 is decreased. By therefore adjusting the degree of pressurization of the spring 18, the height of the seat 22 is adjusted.

Once the height of the seat 22 is adjusted for use and the length of the spring 18 corresponds with its normal ride length (i.e., the length of the spring 18 when at rest and supporting the weight of the seat 22 and seat occupant) it is preferred that the length of the spring 18 is somewhere between its FIG. 2 fully-extended length and its FIG. 3 fully-compressed length so that the seat 22 is not likely to reach its upper or lower limit of travel when exposed to vertically-induced forces of large magnitude. As is the case with many seat air springs of this class, the air spring 18 is intended for use in the seating assembly 20 wherein jounces of the seat 22 during use do not normally require the spring 18 to extend or compress beyond a range, or ride zone, which is about equal to about one-third the total spring extension length (i.e., the difference in length of the spring when measured in its FIG. 2 condition and in its FIG. 3 condition). Accordingly, it is preferred that when the length of the spring 18 corresponds with its normal ride length, the length of the spring 18 is between about one-sixth and five-sixth of the total spring extension length.

It will be understood that in vehicle seat applications such as the environment described herein, the spring 18 is expected to deal primarily with vibrations of higher amplitude. The vehicle seat 22 may, for example, be exposed to the vibrations generated by the operation of the vehicle engine, but these vibrations are commonly of such small amplitude that these vibrations may be effectively isolated from the seat occupant by the seat cushion alone. Accordingly, the vibrations discussed in the examples set forth herein possess an amplitude of sufficient size (i.e., a relatively high amplitude) that the seat itself does not normally isolate the occupant from the vibration. Furthermore and in the interests of this invention, low frequency input is considered to be about seven hertz or lower while high frequency input is considered to be higher than about seven hertz to, for example, about ten hertz.

The structural features of the spring 18 embodied by the variable-volume chamber 108, piston cavity 92 and orifice 110 are advantageous in that these features provide the spring 18 with desirable spring rate characteristics when the seat 22 is exposed to a vibration within a relatively broad frequency range. If, for example, the seat 22 experiences a vertically-induced shock of relatively low frequency (and high amplitude) so that the piston 70 is urged toward the plug 74 at a relatively slow rate during the loading phase of the spring cycle, the internal pressure of the variable-volume chamber 108 tends to slowly increase as a consequence of the slow reduction in the volume of the chamber 108. As the internal pressure of the chamber 108 slowly increases, air contained within the chamber 108 flows through the orifice 110 at a rate which maintains the internal pressures of the chamber 108 and cavity 92 at about equal levels during the loading phase of the spring cycle. Consequently, the damping action of the spring 18 when exposed to a shock of relatively low frequency resembles that of an air spring whose internal volume includes the volumes of both the piston cavity 92 and the chamber 108. With this large volume of air damping the vertical movement of the seat 22, the occupant of the seat 22 is provided with a very soft feel in that his seat is permitted to move greater distances (both during the loading and unloading phases of the spring cycle) at a relatively slow rate.

If, on the other hand, the seat 22 experiences a vertically-induced shock of relatively high frequency (and high amplitude) such as may be experienced upon an encounter of the vehicle to a pot hole in a road so that the piston 70 is forced abruptly toward the plug 74 during the loading phase of the spring cycle, the internal pressure of the variable-volume chamber 108 suddenly increases as a consequence of the sudden reduction in the volume of the chamber 108. As the internal pressure of the chamber 108 suddenly increases, air contained within the chamber 108 is permitted to flow through the orifice 110 but the permitted flow of air is not sufficient to maintain the internal pressure of the chamber 108 and cavity 72 at close levels during the spring loading phase. It follows that the higher the frequency of the shock, the higher the contrast response between the chamber 108 and piston cavity 72 and the less the piston cavity 72 responds, thus allowing the spring rate to sharply increase. Consequently, the damping action of the spring 18 when exposed to a shock of relatively high frequency resembles that of an air spring whose internal volume includes only the volume of the chamber 108. With this smaller (chamber) volume of air damping the movement of the seat 22, the rate of the spring 18 rapidly increases during the spring loading phase to reduce the likelihood that the spring 18 will compress to a length outside of the ride zone for which the spring 18 was designed.

Figure 5:
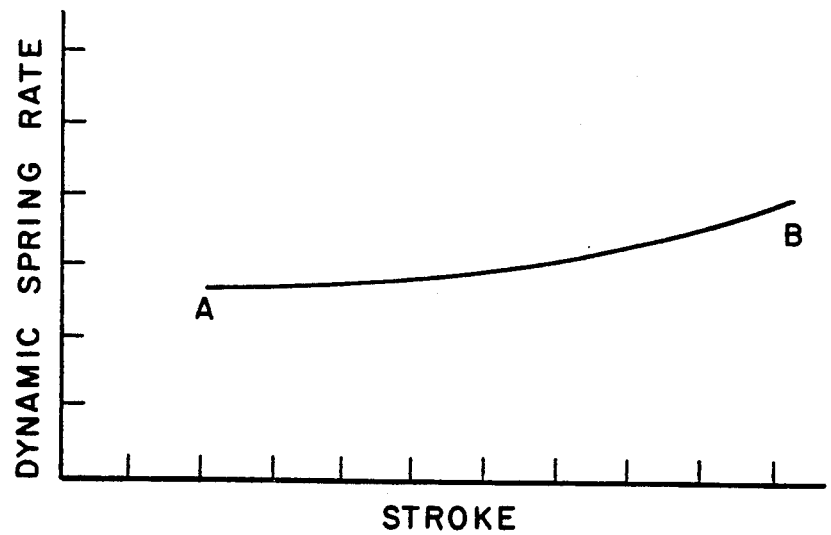
FIG. 5 is a graph illustrating exemplary spring rate characteristics of the FIG. 1 spring when the spring is exposed to an impact force of relatively low frequency.
Figure 6:
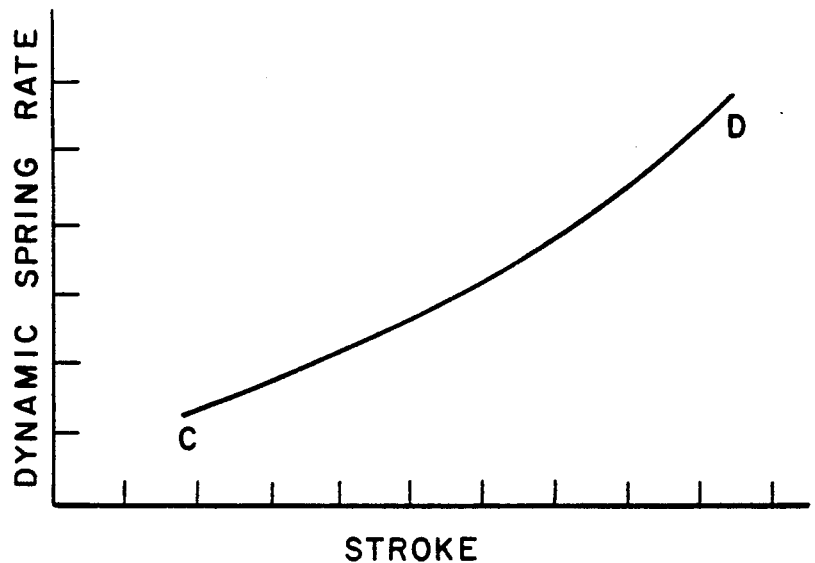
FIG. 6 is a graph illustrating exemplary spring rate characteristics of the FIG. 1 spring when the spring is exposed to an impact force of relatively high frequency.

The aforedescribed advantages can be readily appreciated with reference to the graphs of FIGS. 5 and 6 illustrating exemplary rate characteristics of the spring 18 when the spring 18 is exposed to shocks of low frequency and high frequency, respectively. When the spring 18 is exposed to a shock of relatively low frequency and with reference to FIG. 5, the volumes of the variable-volume chamber 108 and piston cavity 92 act together to cushion the force of the shock throughout the period of spring loading so that the spring rate characteristics of the spring 18 resemble the solid line extending between a start point A to jounce point B. As evidenced by the gradual slope of the FIG. 5 solid line, the spring rate increases only slightly throughout the loading period of the spring 18. Such a slight increase in spring rate evidences a gradual deceleration of the seat 22 so that the occupant of the seat 22 feels a soft cushioning of the shock. During the unloading period of the spring 18 at which the spring 18 returns in length to its normal ride length, the spring rate gradually decreases from the jounce point B toward the start point A.

When the spring 18 is exposed to a shock of relatively high frequency and large amplitude and with reference to FIG. 6, only the volume of the variable-volume chamber 108 contributes appreciably to cushion the force of the shock throughout the period of spring loading so that the spring rate characteristics of the spring 18 resemble the solid line extending between start point C to jounce point D. As evidenced by the steep slope of the FIG. 6 line CD, the spring rate increases sharply (i.e., is very aggressive) throughout the loading period of the spring 18. Such a sharp increase in spring rate evidences a rapid deceleration of the seat 22 so that the likelihood that the spring will be compressed or extended to lengths outside of its ride zone is substantially reduced. Such a feature is in marked contrast to air springs of the prior art which are intended to provide only a gradual increase in spring rate throughout the ride zone.

Figure 7:
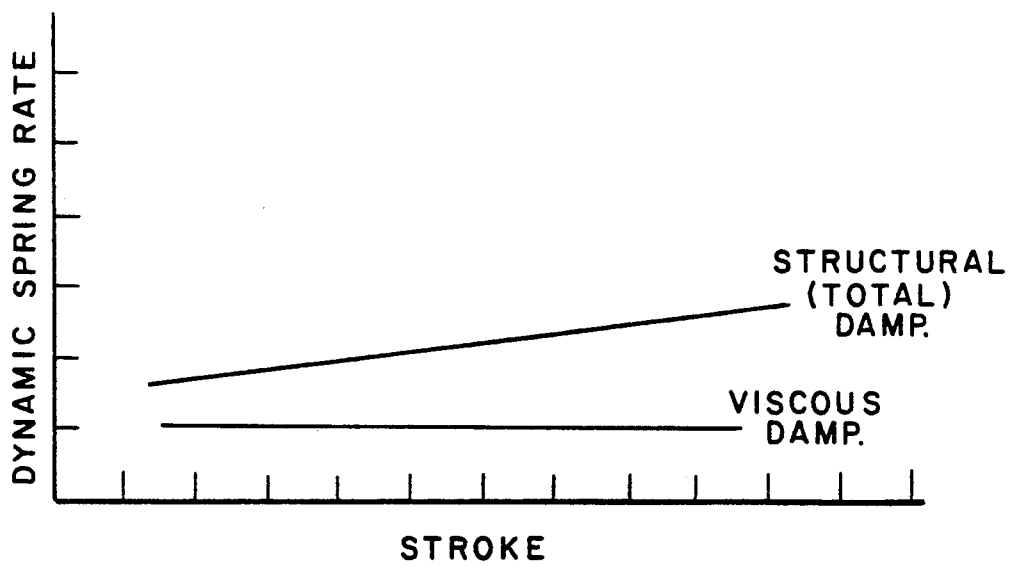
FIG. 7 is a graph illustrating exemplary damping rate characteristics of an alternative air spring which does not possess an orifice.
Figure 8:
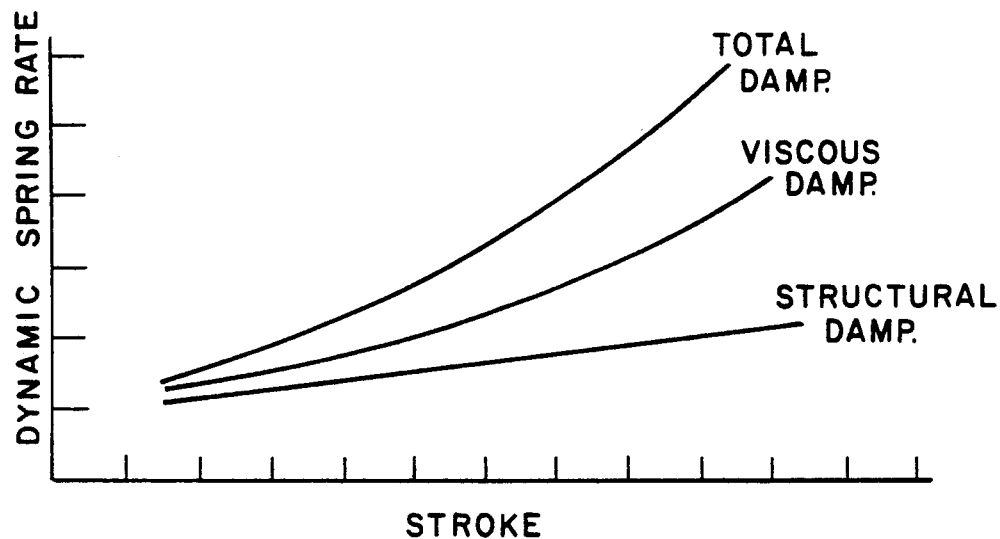
FIG. 8 is a graph illustrating exemplary damping rate characteristics of an air spring, with orifice, embodying features of the present invention.

For comparison purposes, there is illustrated in FIG. 7 a graph illustrating exemplary spring rate characteristics of an alternative air spring which is identical in construction to that of spring 18 except that the alternative spring does not possess an orifice providing flow communication between its variable-volume chamber and its piston cavity, and there is illustrated in FIG. 8 a graph illustrating exemplary spring rate characteristics of the spring 18. In each of the graphs of FIGS. 7 and 8, the curve identifying the total damping characteristics is obtained by adding the contributions of the structural damping characteristics to the viscous damping characteristics. As mentioned earlier, structural damping is the damping which results from the frictional forces produced between the molecules of an elastic body being flexed during spring operation, whereas viscous damping is the damping which results from fluid friction induced during spring operation.

As is apparent in the graph of FIG. 8, each of the structural and viscous damping characteristics contribute appreciably to the total damping rate characteristics of the spring 18. On the other hand, however, the contributions of the viscous damping characteristics to the total damping characteristics of the spring depicted in FIG. 7 are negligible so that the structural damping characteristics comprises the total of the damping rate characteristics. Due to the appreciable contributions of both the structural and viscous damping characteristics to the total damping rate characteristics of the spring 18, the damping characteristics provided by the spring 18 are therefore greater than those which it would provide without the orifice 110, and the spring 18 is further advantageous in this respect.

The spring 18 provides a still further advantage in that its characteristics return the spring 18 to rest a condition of equilibrium (i.e., in its normal ride position) quicker and with a fewer number of movement cycles, or jounce and rebound movements, than would normally be expected if the orifice 110 were not present. In this connection, the orifice 110 continually permits air to flow from the chamber or cavity of higher pressure to the cavity or chamber of lower pressure from the moment of exposure of the spring 18 to a shock to the moment that the spring 18 finally comes to rest in its normal ride position. Such a permitted flow of air effectively reduces the amount of energy which would otherwise be stored up in the chamber or cavity of higher pressure as the spring 18 alternatively extends and compresses between its compression and extension limits before settling to rest. Therefore, once the spring 18 compresses to a compression (i.e., jounce) limit, the chamber 108 of higher pressure possesses less energy with which to rebound the spring 18. Consequently, the spring 18 experiences a fewer number of cyclic movements before settling to rest in its normal ride position and returns to rest in a shorter period of time than would normally be expected if the orifice 110 were not present.

The seat occupant will normally feel downwardly-directed forces at his shoulders each time that the spring 18 moves to a halt at its compression limit in much the same way that a elevator occupant feels heavier as the elevator in which he is riding moves downwardly to a stop. These downwardly-directed forces are known to fatigue the occupant and are felt by the occupant each time the spring 18 cycles to its compression limit. Since the spring 18 settles to rest with a relatively few number of movement cycles as discussed above, the spring 18 reduces the contribution that vertically-induced shocks make to the fatigue of the seat occupant and is further advantageous in this respect. Furthermore and because the useful life of the shock absorber 56 may be effected by the number of operational cycles to which the shock absorber 56 may be exposed, the spring 18 is believed to prolong the useful life of the shock absorber 56 because of its capacity to settle to rest with a relatively few number of movement cycles.

Figure 9:
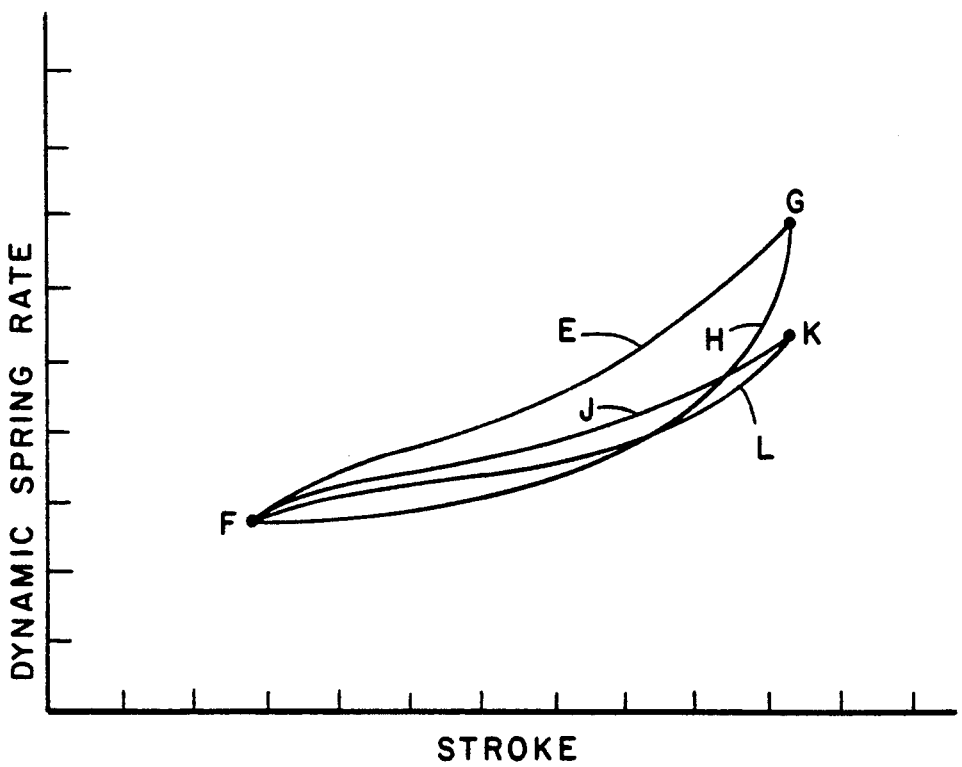
FIG. 9 is a graph illustrating exemplary total damping rate (structural plus viscous damping) hysteresis of an air spring embodying features of the present invention and that of an alternative air spring which does not possess an orifice.

By way of example, there is illustrated in FIG. 9 a graph of exemplary spring rate characteristics of the spring 18 from the moment that the spring 18 encounters a test shock of high frequency and high amplitude to the moment that the spring 18 returns to rest in its normal ride position. In response to the shock, the spring rate evidenced by the spring 18 during the loading phase is represented by the line E extending between start point F and jounce point G. The spring rate evidenced by the spring 18 during the unloading phase is represented by the line H extending between jounce point G and start point F. The fact that the line H does not closely track the line E upon return of the spring 18 to rest in its normal ride position is due to the aforementioned relieving of the pressurized air from the chamber or cavity of higher pressure toward the cavity or chamber of lower pressure. Consequently, for a given spring amplitude between points F and G, the spring rate is appreciably less during its unloading phase than it is during its loading phase. The effect of such a difference in spring rates is that the force created within the spring for a rebound phase of a cycle is less than it would be with no difference in spring rates so that the shock to which the spring 18 is exposed can be damped easier.

For purposes of comparison, there is also illustrated in FIG. 9 a graph of exemplary spring rate characteristics of a second spring which is identical in construction to that of spring 18 except that the second spring does not possess an orifice providing flow communication between its variable-volume chamber and its piston cavity. In response to a test shock of equal frequency and amplitude to that which the spring 18 was exposed, the spring rate evidenced by the second spring during the loading phase is represented by the line J extending from start point F and jounce point K, and the spring rate evidenced by the second spring during the unloading phase is represented by the line L extending between jounce point K and the start point F. Because the chamber or cavity of higher pressure within the second spring cannot be relieved as can the corresponding chamber cavity of the spring 18, the unloading line L tracks the loading line J upon its return to start point F closer than unloading line H tracks loading line E.

As mentioned earlier, the respective tapers of the discreet segments 98, 100 and 102 of the piston control surface 96 have been selected to provide predictable spring characteristics when exposed to a vertically-induced force of a preselected magnitude. As the spring 18 moves between its FIG. 2 fully-extended position and FIG. 3 fully-compressed condition so that the lobe of the sleeve 72 moves along the control surface 96, the control surface 96 operates to alter the effective size of the piston 70 relative to the variable-volume chamber 108. As for example, the sleeve lobe moves along the control surface segment 98 which possesses no taper with respect to the piston axis 93, the effective size of the piston 70 is not altered. As the sleeve lobe moves away from the segment 98 and along the tapered segments 100 of the control surface 96, the effective size of the piston 70 is increased accordingly so that the air is compressed within the variable-volume chamber 108 at a faster rate than the rate at which the air is compressed when the sleeve lobe moves along segment 98. Similarly, as the sleeve lobe moves away from the segment 100 and along the segment 102 having the greatest degree of taper, the air is compressed within the chamber 108 at a faster rate than the rate at which the air is compressed when the sleeve lobe moves along segment 100. As a consequence of these increases in the rate of compression of the air within chamber 108, the rate characteristics exhibited by the spring 18 for a shock of preselected magnitude reflect a substantial increase in the deceleration capacity of the spring 18 as the sleeve lobe moves upwardly along the surface 96. In order, therefore, to provide the spring 18 with predetermined deceleration capacities at its various lengths, the degree of taper of the discreet segments of the control surface 96 are preselected accordingly.

A further advantage provided by the spring 18 relates to its spring characteristics when adjusted so that its normal ride length is relatively short in comparison to the overall length of the spring 18. With the spring 18 adjusted in this manner, the size of the variable-volume chamber 108 provides a smaller proportion of the total volume of spring 18. Consequently, the damping rate change of the spring 18 is greater under these circumstances than it is when the spring 18 is adjusted so that its normal ride length is relatively long so that less downward travel of the piston 70 is necessary to dampen vertical movements of the seat 22. Since the distance that the spring 18 is permitted to travel before reaching its compression limit is shorter when its normal ride length is relatively short, the greater damping rate change of the spring 18 increases the capacity of the spring 18 to bring downward movements of the seat 22 to a halt before the spring 18 reaches its compression limit.

By way of example, the following dimensions of the spring 18 are provided. The diameter of the plug 74 is about 3.0 inches, the length of the sleeve 72 (in its FIG. 2 fully-extended condition) is about 5.25 inches, the diameter of the smaller end of the piston 70 is about 2.75 inches, the diameter of the larger end of the piston 70 is about 3.25 inches, the length of the piston 70 as measured along axis 93 is about 3.13 inches, the piston cavity 92 is about one-third the size of the variable-volume chamber 108 when the spring 18 is in its FIG. 2 fully-extended position, and the orifice 110 is about 0.06 inches in diameter.

It will be understood that numerous modifications and substitutions can be had to the aforedescribed embodiment without departing from the spirit of the invention. For example, although the spring 18 has been shown and described as including a piston 72 having an orifice 110 provided in its face plate 88 of about 0.06 inches in diameter, an orifice in a spring possessing features of this invention may possess any diameter suitable to restrict the flow of air between the variable-volume chamber and the piston cavity relative to a time frame within which the spring is desired to operate. In a seating application within which the spring 18 has been described to operate, an orifice having a diameter within the range of about 0.04 to 0.09 inches will provide satisfactory results, while larger springs used to absorb extremely large shocks may require larger orifice sizes. Still further, multiple orifices may be used and/or various piston profiles and various chamber sizes in combination may be used to tune the air spring damping characteristics to achieve the desired results in a given application. Accordingly principles of the present invention may be variously applied and the aforedescribed embodiment is intended for the purpose of illustration and not as limitation.

I claim:

1. A pneumatic spring for damping relative motion between two objects, said spring comprising:

a flexible tubular sleeve having two opposite ends and sidewalls which extend between the ends, a piston including external sidewalls sized to accommodate longitudinal movement of the piston through an interior of the sleeve and an internal cavity of predetermined fixed volume for holding a pneumatic fluid, one end of the tubular sleeve being attached about the piston so that as the piston is moved longitudinally through the sleeve as aforesaid, the sleeve sidewalls move as a rolling lobe along the external sidewalls of the piston; and a plug for closing the end of the tubular sleeve opposite said one end so that the piston, plug and sleeve collectively provide a variable-volume chamber for holding a pneumatic so that as the piston is moved longitudinally through the sleeve toward the plug end thereof, the volume of the chamber decreases; and means defining a flow control orifice for providing continual flow communication between the piston cavity of fixed volume and the variable-volume chamber so that when the spring is interposed between said two objects and the piston is moved longitudinally through the sleeve toward the plug end thereof in response to relative motion between the two objects, the orifice controls the rate at which pneumatic fluid contained within the variable-volume chamber is permitted to flow into the piston cavity, and wherein the orifice of the orifice-defining means is sized so as to be small enough so that during a loading phase of the spring wherein the piston and plug are urged quickly toward one another to the compression limit of the spring, the orifice limits the volume loss of pneumatic fluid from the variable-volume chamber so that the spring rate of the spring increases to a relatively high level, and the orifice of the orifice-defining means is sized so as to be large enough so that during an unloading phase of the spring which follows the aforesaid loading phase, the orifice bleeds off fluid and pressure from the variable-volume chamber to rapidly reduce the spring rate of the spring.

2. The spring as defined in claim 1 wherein the orifice is circular in shape and has a diameter within the range of about 0.04 to 0.09 inches.

3. The spring as defined in claim 1 wherein the variable-volume chamber possesses its largest volume when the spring is fully extended, and the volume of the piston cavity is about one-third the size of the largest volume of the variable-volume chamber.

4. The spring as defined in claim 1 wherein the piston includes a rigid partition which separates the piston cavity from the variable-volume chamber and which includes a small through-opening communicating with the piston cavity and the variable-volume chamber, and the orifice-defining means is provided by the rigid partition.

5. The spring as defined in claim 1 wherein the piston is elongated in shape and arranged so that its longitudinal axis is aligned with the longitudinal axis of the sleeve, and the external sidewalls of the piston are generally frustro-conical in form so that the smallest radial cross section of the piston is located adjacent the end of the piston closest to the plug.

6. The spring as defined in claim 1 wherein the piston is elongated in shape with a face end which generally faces the plug and the external sidewalls of the piston extend along the sides of the piston and are positively tapered as a path is traced along the longitudinal axis of the piston from the face end thereof.

7. The spring as defined in claim 6 wherein the external sidewalls of the piston includes at least two segments between the piston ends which have different degrees of taper.

8. A pneumatic spring for damping relative motion between two objects, said spring comprising:
an elongated piston having two opposite ends and including means providing an internal piston cavity of fixed volume for containing pneumatic fluid and external sidewalls extending along the outside of the piston between the opposite ends thereof, said piston also including a face adjacent one end of the piston which intersects the longitudinal axis of the piston;
a plug arranged along the longitudinal axis of the piston adjacent the face-end of the piston;
a flexible tubular sleeve having two opposite ends and sidewalls extending between the opposite ends, one end of the sleeve being sealingly connected about the plug and the other end of the sleeve being sealingly connected about the piston so that the sleeve, piston and plug collectively provide a variable-volume chamber for holding pneumatic fluid,
the sidewalls of the sleeve adapted to move as a rolling lobe along the external sidewalls of the piston as the piston and plug are moved toward one another along the longitudinal axis of the piston;
said piston including a flow control orifice for providing continual flow communication between said variable-volume chamber and the internal cavity of the piston wherein the orifice of the piston is sized so as to be small enough so that during a loading phase of the spring wherein the piston and plug move toward one another in response to sudden relative motion between said two objects, the orifice controllably limits the flow of pneumatic fluid between the variable-volume chamber and the piston cavity so that the spring rate of the spring increases to a relatively high level and a relatively high pressure differential between the variable-volume chamber and the piston cavity is created, and wherein the orifice of the piston is sized so as to be large enough so that throughout an unloading phase of the spring which follows the aforesaid loading phase, the orifice bleeds off fluid and pressure from the variable-volume chamber so that the spring rate characteristics of the spring throughout the unloading phase differ appreciably from the spring rate characteristics of the spring throughout the loading phase.

9. The spring as defined in claim 8 wherein the orifice is circular in shape and has a diameter within the range of about 0.04 to 0.09 inches.

10. The spring as defined in claim 8 wherein the variable-volume chamber possesses its largest volume when the spring is fully extended, and the volume of the piston cavity is about one-third the size of the largest volume of the variable-volume chamber.

11. The spring as defined in claim 8 wherein the piston face is generally planar and intersects the longitudinal axis of the piston at a right angle.

12. The spring as defined in claim 8 wherein the external sidewalls of the piston generally frustro-conical in form so that the smallest radial cross section of the piston is located adjacent the face-end of the piston.

13. The spring as defined in claim 8 wherein the external sidewalls of the piston are positively tapered as a path is traced along the longitudinal axis of the piston from the face-end thereof.

14. The spring as defined in claim 8 wherein the external sidewalls of the piston includes at least two segments between the piston ends which have different degrees of taper.

15. A vehicle seat assembly comprising:
a seat;
a base upon which the seat is supported for movement relative to the base along a path of movement, and
a pneumatic spring interposed between the seat and the base for damping relative movement between the seat and the base along the path of movement including:
a) an elongated piston having two opposite ends and including means providing an internal piston cavity of fixed volume for containing pneumatic fluid and external sidewalls extending along the outside of the piston between the opposite ends thereof, said piston also including a face adjacent one end of the piston and which intersects the longitudinal axis of the piston;
b) a plug arranged along the longitudinal axis of the piston adjacent the face-end of the piston;
c) a flexible tubular sleeve having two opposite ends and sidewalls extending between the opposite ends, one end of the sleeve being sealingly connected about the plug and the other end of the sleeve being sealingly connected about the piston so that the sleeve, the piston face and plug collectively provide a variable-volume chamber for holding pneumatic fluid, the sidewalls of the sleeve adapted to move as a rolling lobe along the external sidewalls of the piston as the piston and plug are moved toward one another along the longitudinal axis of the piston;
d) one of the piston and plug being attached to the seat and the other of the piston and plug being attached to the base so that upon exposure of the seat assembly to forces which move the seat and frame relative to one another, the piston and plug are moved toward one another to effect an increase in internal pressure of the variable-volume chamber; and
e) said piston including a flow control orifice for providing continual flow communication between said variable-volume chamber and the internal cavity of the piston, wherein the orifice of said piston is sized so as to be small enough so that during a loading phase of the spring wherein the piston and plug are urged quickly toward one another to the compression limit of the spring, the orifice limits the volume loss of pneumatic fluid from the variable-volume chamber so that the spring rate of the spring increases to a relatively high level, and wherein the orifice of said piston is sized so as to be large enough so that during an unloading phase of the spring which follows the aforesaid loading phase, the orifice bleeds off fluid and pressure from the variable-volume chamber to rapidly reduce the spring rate of the spring.

16. The seat assembly as defined in claim 15 wherein the orifice is circular in shape and has a diameter within the range of about 0.04 to 0.09 inches.

17. The seat assembly as defined in claim 15 wherein the external sidewalls of the piston are positively tapered as a path is traced along the longitudinal axis of the piston from the face-end thereof.

18. The seat assembly as defined in claim 15 wherein the variable-volume chamber possesses its largest volume when the spring is fully extended, and the volume of the piston cavity is about one-third the size of the largest volume of the variable-volume chamber, and the piston includes a rigid partition which separates the piston cavity from the variable-volume chamber and which includes a small through-opening communicating with the piston cavity and the variable-volume chamber, and the orifice of the piston is provided by the rigid partition.

19. The seat assembly as defined in claim 18 wherein the through-opening is circular in shape and has a diameter of within the range of about 0.04 to 0.09 inches.

20. The seat assembly as defined in claim 18 wherein the plug is circular in shape and has a diameter of about 3.0 inches, the length of the sleeve, when extended, is about 5.25 inches, the piston has sidewalls of substantially frusto-conical configuration so that the face end of the piston has a diameter of about 2.75 inches and the end of the piston opposite its face end has a diameter of about 3.25 inches, the piston has a length as measured between its opposite ends of about 3.13 inches, and the through-opening is circular in shape and about 0.06 inches in diameter.

* * * * *